US012607168B2

(12) United States Patent
Fenger

(10) Patent No.: US 12,607,168 B2
(45) Date of Patent: Apr. 21, 2026

(54) METHOD OF PERFORMING SERVICE WORK ON A HORIZONTAL AXIS WIND TURBINE

(71) Applicant: LIFTRA IP APS, Aalborg SV (DK)

(72) Inventor: Per Eske Fenger, Terndrup (DK)

(73) Assignee: LIFTRA IP APS, Aalborg (DK)

( * ) Notice: Subject to any disclaimer, the term of this patent is extended or adjusted under 35 U.S.C. 154(b) by 0 days.

(21) Appl. No.: 18/697,906

(22) PCT Filed: Sep. 28, 2022

(86) PCT No.: PCT/EP2022/076939
§ 371 (c)(1),
(2) Date: Apr. 2, 2024

(87) PCT Pub. No.: WO2023/057274
PCT Pub. Date: Apr. 13, 2023

(65) Prior Publication Data
US 2025/0237194 A1 Jul. 24, 2025

(30) Foreign Application Priority Data

Oct. 7, 2021 (EP) ..................................... 21201395

(51) Int. Cl.
| *F03D 80/50* | (2016.01) |
| *F03D 7/02* | (2006.01) |
| *B66C 23/34* | (2006.01) |

(52) U.S. Cl.
CPC ........... *F03D 80/50* (2016.05); *F03D 7/0224* (2013.01); *B66C 23/34* (2013.01); *F03D 7/02* (2013.01);
(Continued)

(58) Field of Classification Search
CPC ........ F03D 80/50; F03D 7/0224; F03D 7/024; F03D 7/02; F05B 2260/96; F05B 2230/80;
(Continued)

(56) References Cited

U.S. PATENT DOCUMENTS

| 8,281,442 B2 * | 10/2012 | Eggleston | ............... B08B 3/022 |
| | | | 15/21.1 |
| 9,803,621 B2 | 10/2017 | Simonsen et al. | |

(Continued)

FOREIGN PATENT DOCUMENTS

| DE | 19909698 A1 * | 4/2000 | ............ B66F 11/044 |
| EP | 2 306 005 A2 | 4/2011 | |

(Continued)

OTHER PUBLICATIONS

Featured Crane Liftra LT1000 Self-Hoisting Crane (Year: 2017).*

(Continued)

*Primary Examiner* — Nathaniel E Wiehe
*Assistant Examiner* — Art Golik
(74) *Attorney, Agent, or Firm* — Bookoff McAndrews PLLC

(57) ABSTRACT

A wind turbine (1) has three wind turbine blades ($6_1$, $6_2$, $6_3$), each being arranged rotatably on the rotor hub (5) about a pitch axis in order to adjust a pitch angle of the wind turbine blade. Before performing the service work, a pitch angle adjustment is performed so that a pitch angle difference between respective pitch angles of two of the wind turbine blades is between 45 degrees and 135 degrees or between 225 degrees and 315 degrees. After performing the service work, a pitch angle adjustment is performed so that there is at least substantially no pitch angle difference between pitch angles of the respective wind turbine blades of the rotor (4). During the service work, the rotor is maintained in a
(Continued)

rotational position in which a longitudinal axis of the third wind turbine blade forms an angle of not more than 5 degrees with a horizontal axis.

9 Claims, 9 Drawing Sheets

(52) U.S. Cl.
CPC .......... *F03D 7/024* (2013.01); *F05B 2230/61* (2013.01); *F05B 2230/80* (2013.01); *F05B 2260/70* (2013.01); *F05B 2260/96* (2013.01)

(58) Field of Classification Search
CPC ... F05B 2260/70; F05B 2230/61; B66C 23/34
See application file for complete search history.

(56) References Cited

U.S. PATENT DOCUMENTS

| | | | | |
|---|---|---|---|---|
| 2011/0076142 A1* | 3/2011 | Veldkamp | ............. | F03D 7/0224 |
| | | | | 416/31 |
| 2017/0306930 A1* | 10/2017 | Fenger | .................. | B23B 31/101 |

FOREIGN PATENT DOCUMENTS

| | | | | |
|---|---|---|---|---|
| WO | 2016/055065 A1 | 4/2016 | | |
| WO | WO-2020221716 A1 * | 11/2020 | ............. | B66C 23/20 |

OTHER PUBLICATIONS

Liftra Self Hoisting Crane Presentation (Year: 2016).*
International Report on Patentability mailed Jul. 20, 2023 in International Application No. PCT/EP2022/076939 (7 pages).
International Search Report and Written Opinion mailed Dec. 6, 2022 in International Application No. PCT/EP2022/076939 (9 pages).

* cited by examiner

--PRIOR ART--

--PRIOR ART--

--PRIOR ART--

--PRIOR ART--

| | Configuration 1 All blades at 90 degrees (kNm) | Configuration 2 Two blades at 0 degrees (kNm) | Configuration 3 One blade at 0 degrees (kNm) | Configuration 4 One blade at 0 degrees and horizontal (kNm) |
|---|---|---|---|---|
| Case 1 (wind from left side) | 115 | -532 | -355 | -106 |
| Case 2 (wind from back) | -327 | -240 | -217 | -254 |
| Case 3 (wind from front) | 3 | -157 | -202 | -204 |
| Case 4 (wind from right side) | -93 | 446 | 228 | 139 |

FIG. 6

| Blade | Case 1<br>Wind from left side<br>(kNm) | Case 4<br>Wind from right side<br>(kNm) | Case 3<br>Wind from front<br>(kNm) | Case 2<br>Wind from back<br>(kNm) |
|---|---|---|---|---|
| 1 | -488 | 493 | -52 | -109 |
| 2 | 383 | -355 | -52 | -88 |
| 3 | -1 | 1 | -100 | -57 |
| Total | -106 | 139 | -204 | -254 |

FIG. 7

METHOD OF PERFORMING SERVICE WORK ON A HORIZONTAL AXIS WIND TURBINE

CROSS-REFERENCE TO RELATED APPLICATION(S)

This is a National Stage Application under 35 U.S.C. § 371 of International Application No. PCT/EP2022/076939, filed Sep. 28, 2022, which claims priority to European Patent Application No. 21201395.7, filed on Oct. 7, 2021.

The present invention relates to a method of performing service work on a horizontal axis wind turbine having a tower carrying a nacelle with a rotor, the rotor having a rotor hub and three wind turbine blades equally distributed about the rotor hub, each wind turbine blade being arranged rotationally adjustably on the rotor hub about a pitch axis between at least one operational pitch angle corresponding to a normal operational angle of attack of the wind turbine blade and at least one non-operational pitch angle corresponding to a non-operational angle of attack of the wind turbine blade, whereby, before performing the service work, a pitch angle adjustment of at least one of the wind turbine blades is performed so that a pitch angle difference between respective pitch angles of two of the wind turbine blades is between 45 degrees and 135 degrees or between 225 degrees and 315 degrees, whereby before performing the service work, the respective pitch angles of a first one and a second one of the wind turbine blades are adjusted by rotation to one of their at least one non-operational pitch angles, and the pitch angle of a third one of the wind turbine blades is maintained in or adjusted by rotation to one of its at least one operational pitch angles, whereby, after performing the service work, a pitch angle adjustment of at least one of the wind turbine blades is performed so that there is at least substantially no pitch angle difference between pitch angles of the respective wind turbine blades of the rotor, and whereby, after performing the service work, the respective pitch angles of the first and the second wind turbine blades are adjusted by rotation to one of their at least one operational pitch angles.

WO 2016/055065 A1 (Liftra IP ApS) discloses a main shaft fixture in the form of a rotor lock for fixing in place a main shaft of a wind turbine during execution of installation and repair work on the heavy parts of the wind turbine arranged in the nacelle of wind turbines. Thereby, the wind turbine rotor may be prevented from rotating while servicing the turbine. The fixture is divided up into a number of sections for mounting on stable structural parts that are found in a wind turbine's nacelle, including the nacelle's bottom frame. The main shaft fixture also comprises facilities for the mounting of a lightweight crane and a self-hoisting crane with a ground-based winch.

Although, by means of a rotor lock as described above, the wind turbine rotor may be prevented from rotating while servicing the turbine, normally, the blades are also pitched out of wind to minimize the wind loads on the rotor and the resulting torque on the rotor lock. This is done by pitching all three blades to a 90 degrees pitch angle. During operation, on the other hand, the blades are pitched to a theoretical 0 degrees pitch angle or any other suitable operational pitch angle. This procedure of pitching the blades out of the wind is in particular effective when the rotor is oriented towards the wind, however, it may not always be possible to yaw the rotor to this orientation. The wind can come from all angles around the turbine, and the wind direction may change during servicing. For instance, in the case that a self-hoisting crane with a ground-based winch, possibly placed in a container, is employed, the ground-based winch cannot easily be repositioned during servicing. Therefore, the rotor lock may have to withstand a considerable torque.

Furthermore, as wind turbines generally increase in size and/or are upgraded to higher performance, existing rotor locks may become overpowered by the wind forces. As a result, the wind speeds at which the rotor can be locked are decreased. This lowers the serviceable window of wind speeds.

On the other hand, when a rotor lock is delivered, either as a part of a self-hoisting crane system or as a stand-alone rotor lock, the weight of the rotor lock is a limiting factor, because the self-hoisting crane or a smaller up tower service crane has to lift the rotor lock to the nacelle. Furthermore, there are typically spatial limitations in the nacelle of the wind turbine. Consequently, it is not possible just increasing the size of current rotor locks in order to increase the wind speeds at which the rotor can be locked.

Even more importantly, by the known procedure of pitching all three blades out of the wind during servicing, the wind forces may under certain circumstances cause the wind turbine tower to sway back and forth above acceptable levels for performing service work in the nacelle. This may be the result of vortex shedding which is an oscillating flow that in this case takes place when the air flows past the wind turbine tower at certain velocities. In this flow, vortices are created behind the wind turbine tower, seen in the wind direction, and detach periodically from either side of the tower forming a Von Karman vortex street. The air flow past the wind turbine tower creates alternating low-pressure vortices on the downstream side of the tower which will tend to move toward the low-pressure zone. If the frequency of vortex shedding matches the resonance frequency of the wind turbine tower, then the tower can begin to resonate, vibrating with harmonic oscillations driven by the energy of the air. The vibrations will occur in a transverse direction of the wind direction.

EP 2 306 005 A2 discloses a method that reduces vibrations of a wind turbine in a situation where yawing of a wind rotor of said wind turbine is at least temporarily not possible. The method includes adjusting a first pitch angle of a first rotor blade and a second pitch angle of a second rotor blade such that the first and second pitch angles differ by at least 30 degrees. In an embodiment, upon detection of the situation where yawing of the wind rotor is at least temporarily not possible, the wind rotor is parked in a position in which none of the rotor blades is positioned in the vicinity of a tower of the wind turbine.

WO 2020/221716 A1 (Liftra IP ApS) discloses a self-hoisting crane is adapted to be hoisted from a container to a nacelle by operating a cable winch in the container, at least one cable is adapted to extend from the cable winch, around an exit sheave arranged in the container, and exit the container from the exit sheave in an upward direction in order to pass around at least one roller arranged at a crane base on the nacelle and continue in a downward direction to the crane, enter through a central opening in the crane pedestal and continue to the hook block. The exit sheave is located at a longitudinal position of the container deviating not more than 10 percent of the length of the container from the longitudinal position of the centre of gravity of the container.

U.S. Pat. No. 9,803,621 B2 discloses a method for controlling a wind turbine that comprises a nacelle and one or more turbine blades to reduce or prevent edgewise vibrations building up on the one or more turbine blades. It is identified whether the nacelle is unable to yaw to an upwind position and initiating a corrective action to prevent edgewise vibrations building up on the one or more turbine blades if the nacelle is unable to yaw to an upwind position. Initiating the corrective action comprises instructing at least one of the one or more turbine blades to continuously change pitch.

The object of the present invention is to provide a method of performing service work on a wind turbine, whereby the wind turbine tower may be prevented from swaying back and forth above acceptable levels, and whereby the maximum torque experienced by the rotor during servicing as a result of the wind loads may be minimised.

In view of this object, during the service work, the rotor is maintained in a rotational position in which a longitudinal axis of the third wind turbine blade forms an angle of not more than 5 degrees with a horizontal axis.

In this way, by, during servicing, arranging some of the wind turbine blades with at least substantially differing pitch angles, no matter in which direction the wind is blowing, at least one of the wind turbine blades may be oriented in such a way that it may at least to some extent prevent swaying of the tower in a transverse direction of the wind direction with its resonance frequency, because sufficient drag forces are acting on said blade when the tower sways. For instance, if the wind comes from the left of the wind turbine tower, when looking from the front side of the rotor, a wind turbine blade arranged at a pitch angle of 0 degrees may dampen swaying of the tower in a transverse direction of the wind as a result of vortex shedding at the tower. On the other hand, if the wind comes from the front side of the rotor, a wind turbine blade arranged at a pitch angle of 90 degrees may dampen swaying of the tower in a transverse direction of the wind as a result of vortex shedding at the tower.

Tests have proven that, according to the present invention, by arranging some of the wind turbine blades with at least substantially differing pitch angles, and by further, during the service work, maintaining the rotor in a rotational position in which a longitudinal axis of the third wind turbine blade forms an angle of not more than 5 degrees with a horizontal axis, the maximum torque experienced by the rotor during servicing as a result of the wind loads may still be kept relatively low when compared to the known method of pitching all three blades out of the wind. Tests have been performed for several different wind directions, and it has been found that, according to the present invention, the wind speeds at which the rotor can be locked by means of existing rotor locks may not necessarily differ substantially from the known method of pitching all three blades out of the wind.

In an embodiment, before performing the service work, a pitch angle adjustment of at least one of the wind turbine blades is performed so that a pitch angle difference between respective pitch angles of two of the wind turbine blades is between 55 degrees and 125 degrees or between 235 degrees and 305 degrees. Thereby, swaying of the tower with its resonance frequency may be even better prevented.

In an embodiment, before performing the service work, a pitch angle adjustment of at least one of the wind turbine blades is performed so that a pitch angle difference between respective pitch angles of two of the wind turbine blades is between 65 degrees and 115 degrees or between 245 degrees and 295 degrees. Thereby, swaying of the tower with its resonance frequency may be even better prevented.

In an embodiment, before performing the service work, a pitch angle adjustment of at least one of the wind turbine blades is performed so that a pitch angle difference between respective pitch angles of two of the wind turbine blades is between 75 degrees and 105 degrees or between 255 degrees and 285 degrees. Thereby, swaying of the tower with its resonance frequency may be even better prevented.

In an embodiment, before performing the service work, a pitch angle adjustment of at least one of the wind turbine blades is performed so that a pitch angle difference between respective pitch angles of two of the wind turbine blades is between 85 degrees and 95 degrees or between 265 degrees and 275 degrees. Thereby, swaying of the tower with its resonance frequency may be even better prevented.

In an embodiment, before performing the service work, a pitch angle adjustment of at least one of the wind turbine blades is performed so that a pitch angle difference between respective pitch angles of two of the wind turbine blades is about 90 degrees or about 270 degrees. Thereby, swaying of the tower with its resonance frequency may be even better prevented.

In an embodiment, the at least one operational pitch angle deviates not more than 10 degrees, and preferably not more than 5 degrees from a theoretical pitch angle of 0 degrees.

In an embodiment, the respective pitch angles of the wind turbine blades are adjusted by means of a pitch control system of the wind turbine, the pitch control system including electric motors and/or hydraulic motors or cylinders. Thereby, the method may easily be performed by means of the existing pitch control system of the wind turbine.

In an embodiment, before performing the service work, the rotor is fixed against rotation, and whereby, after performing the service work, the rotor is set free for rotation. Thereby, service work may be performed in a safe manner.

In an embodiment, the rotor is fixed against rotation by means of a main shaft fixture adapted for fixation of a main shaft of the rotor.

In an embodiment, the rotor is fixed against rotation by means of a separate, removable main shaft fixture which is hoisted up to the nacelle before performing the service work and which is hoisted down from the nacelle after performing the service work.

In an embodiment, a self-hoisting crane is lifted to the nacelle of the wind turbine and mounted at the nacelle, and the self-hoisting crane is used for lifting and/or lowering components for the wind turbine. The method according to the invention is in particular advantageous when using a self-hoisting crane system, because in this case, during lifting operations, the crane system cannot easily be repositioned.

In an embodiment, a self-hoisting crane system includes the self-hoisting crane and a container for transporting, lifting and lowering the self-hoisting crane to and from the nacelle of the wind turbine, the container includes a cable winch, at least one cable is extended from the cable winch in the container to the nacelle, and the self-hoisting crane is hoisted from the container to the nacelle by operating the cable winch in the container. The method according to the invention is in particular advantageous when using a self-hoisting crane system including the self-hoisting crane and a container, because in this case, the container and an included ground-based winch cannot easily be repositioned during servicing.

The invention will now be explained in more detail below by means of examples of embodiments with reference to the very schematic drawing, in which FIG. 1A is a front view of a wind turbine having three blades, each blade being adjusted to a pitch angle of 0 degrees for normal operation;

FIG. 6 is a table illustrating a simulated wind turbine rotor turning torque for different configurations of blade pitch angles at different wind directions;

FIG. 7 is a table illustrating a simulated partial wind turbine rotor turning torque contribution from each rotor blade of the wind turbine in the configuration (Configuration 4) illustrated in FIG. 5A, at different wind directions.

Figures 1A, 1B:
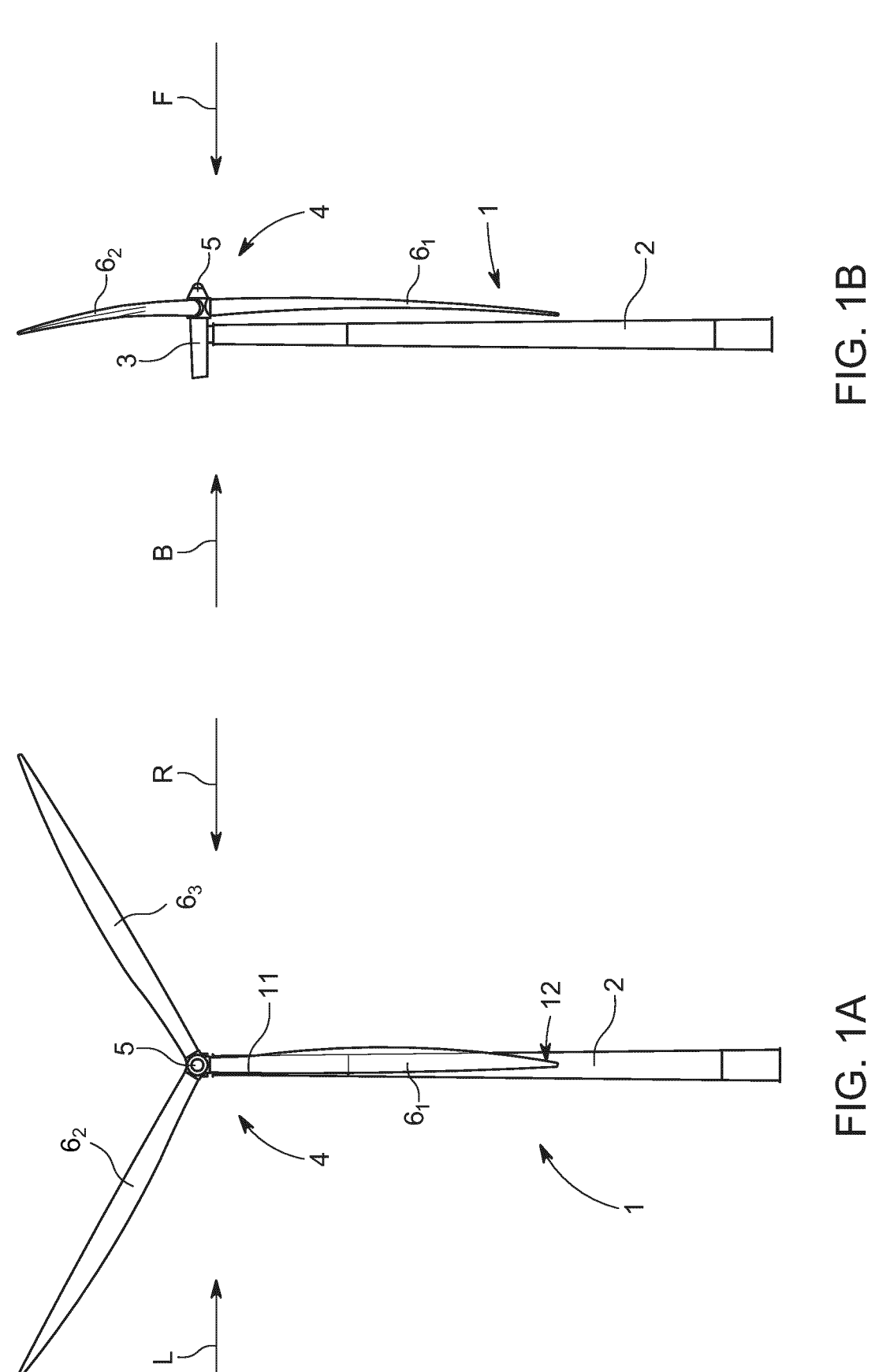
FIG. 1B is a side view of the wind turbine of FIG. 1A.

FIGS. 1A and 1B illustrate a horizontal axis wind turbine 1 per se of well-known type having a tower 2 carrying a nacelle 3 with a rotor 4. The rotor has a rotor hub 5 and three wind turbine blades $6_1$, $6_2$, $6_3$, each of which is arranged rotatably on the rotor hub about a pitch axis in order to adjust a pitch angle of the wind turbine blade, thereby defining an orientation of the wind turbine blade $6_1$, $6_2$, $6_3$ about its pitch axis. Thereby, each wind turbine blade $6_1$, $6_2$, $6_3$ is arranged rotationally adjustably on the rotor hub 5 between a number of operational pitch angles, each corresponding to a normal operational angle of attack of the wind turbine blade $6_1$, $6_2$, $6_3$ and a number of non-operational pitch angles, each corresponding to a non-operational angle of attack of the wind turbine blade $6_1$, $6_2$, $6_3$. As it is known in the art, the nacelle 3 is rotatable on the tower 2 about a vertical axis in order to yaw the rotor 4. Thereby, the rotor 4 may be oriented with its plane of rotation at right angles to the wind direction for normal operation.

In FIGS. 1A and 1B, four wind directions are indicated: From left L, From right R, From front F and from back B.

In FIGS. 1A and 1B, all three wind turbine blades $6_1$, $6_2$, $6_3$ are adjusted to an operational pitch angle of a theoretical 0 degrees pitch angle, corresponding to a normal operational angle of attack of the wind turbine blade $6_1$, $6_2$, $6_3$. According to common technical terminology, provided that the wind direction is from the front F of the rotor 4, the three wind turbine blades are said to be pitched into the wind.

A pitch angle is defined around a pitch axis, the pitch axis being defined as being perpendicular to a root end 11 of the blade $6_1$, $6_2$, $6_3$ and extending from the center of the root end. When the pitch angle is 0 degrees, the blade is in a position where the wind reaction on the blade creates the largest rotational moment, when the wind is acting on the turbine perpendicular to the rotor plane. A pitch angle of 90 degrees is a position, where the rotational moment is the lowest, when the wind is acting on the turbine perpendicular to the rotor plane. Often the blades $6_1$, $6_2$, $6_3$ are twisted along their length, in order to adapt to varying relative wind speeds along the length of the blades, and in this case the pitch angle may be defined as the pitch angle at the root end 11.

Although theoretically, the largest rotational moment is obtained at a pitch angle of 0 degrees, the optimal operational pitch angle may vary depending of different factors, such as wind speed. Therefore, as mentioned above, the wind turbine blades $6_1$, $6_2$, $6_3$, are arranged rotationally adjustably on the rotor hub 5 between a number of operational pitch angles, such as for instance a pitch angle of 1, 2, 3, 4 or 5 degrees.

Preferably, the at least one operational pitch angle deviates not more than 5 degrees from a theoretical pitch angle of 0 degrees. However, according to this disclosure, an operational pitch angle may be up to 7, 10 or even 20 degrees or more.

Likewise, although theoretically, when the wind is directed from the front F, the smallest rotational moment is obtained at a pitch angle of 90 degrees measured relatively to a theoretical pitch angle of 0 degrees, a non-operational pitch angle may vary depending of different factors, such as wind speed. Therefore, as mentioned above, the wind turbine blades $6_1$, $6_2$, $6_3$, are arranged rotationally adjustably on the rotor hub 5 between a number of non-operational pitch angles, such as for instance a pitch angle of 90, 85, 80, 75, 70, 65 or 60 degrees. Preferably, according to this disclosure, a non-operational pitch angle is understood to not deviate more than approximately 20 degrees from a pitch angle of 90 degrees.

Figure 2B:
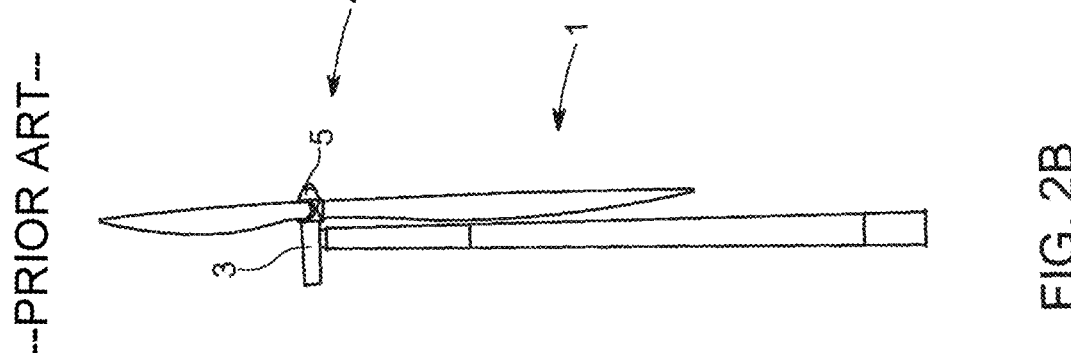
FIG. 2B is a side view of the wind turbine in the configuration shown in FIG. 2A.
Figure 2A:
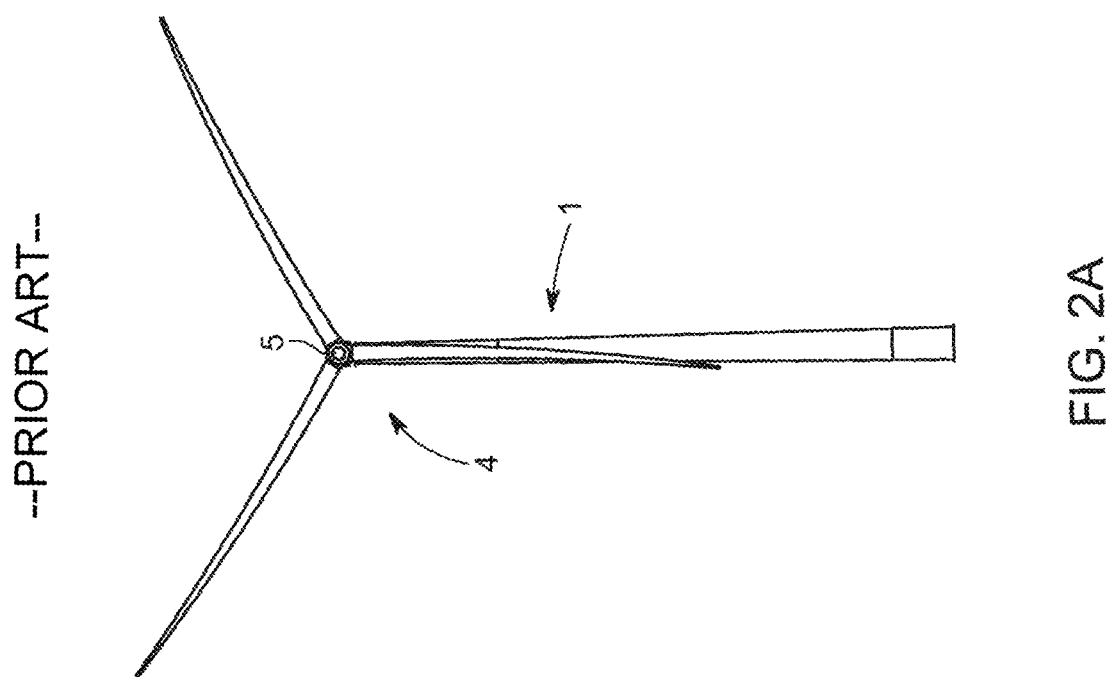
FIG. 2A is a front view of the wind turbine of FIG. 1A, whereby, according to a prior art method, each blade has been adjusted to a pitch angle of 90 degrees (denoted Configuration 1)

In order to perform service and/or installation work, the rotor 4 is typically fixed against rotation, typically by means of a not shown main shaft fixture adapted for fixation of a not shown main shaft of the rotor 4. Furthermore, according to prior art methods, as illustrated in FIGS. 2A and 2B, in order to reduce the torque on the main shaft fixture, also called a rotor lock, the pitch angle of each wind turbine blade is adjusted by rotation to a non-operational pitch angle of 90 degrees. According to common technical terminology, in this situation, provided that the wind direction is from the front F of the rotor 4, the three wind turbine blades are said to be pitched out of the wind. After performing the service and/or installation work, the rotor 4 is set free for rotation and the pitch angle of each wind turbine blade is adjusted by rotation to an operational pitch angle.

Figures 3A, 3B:
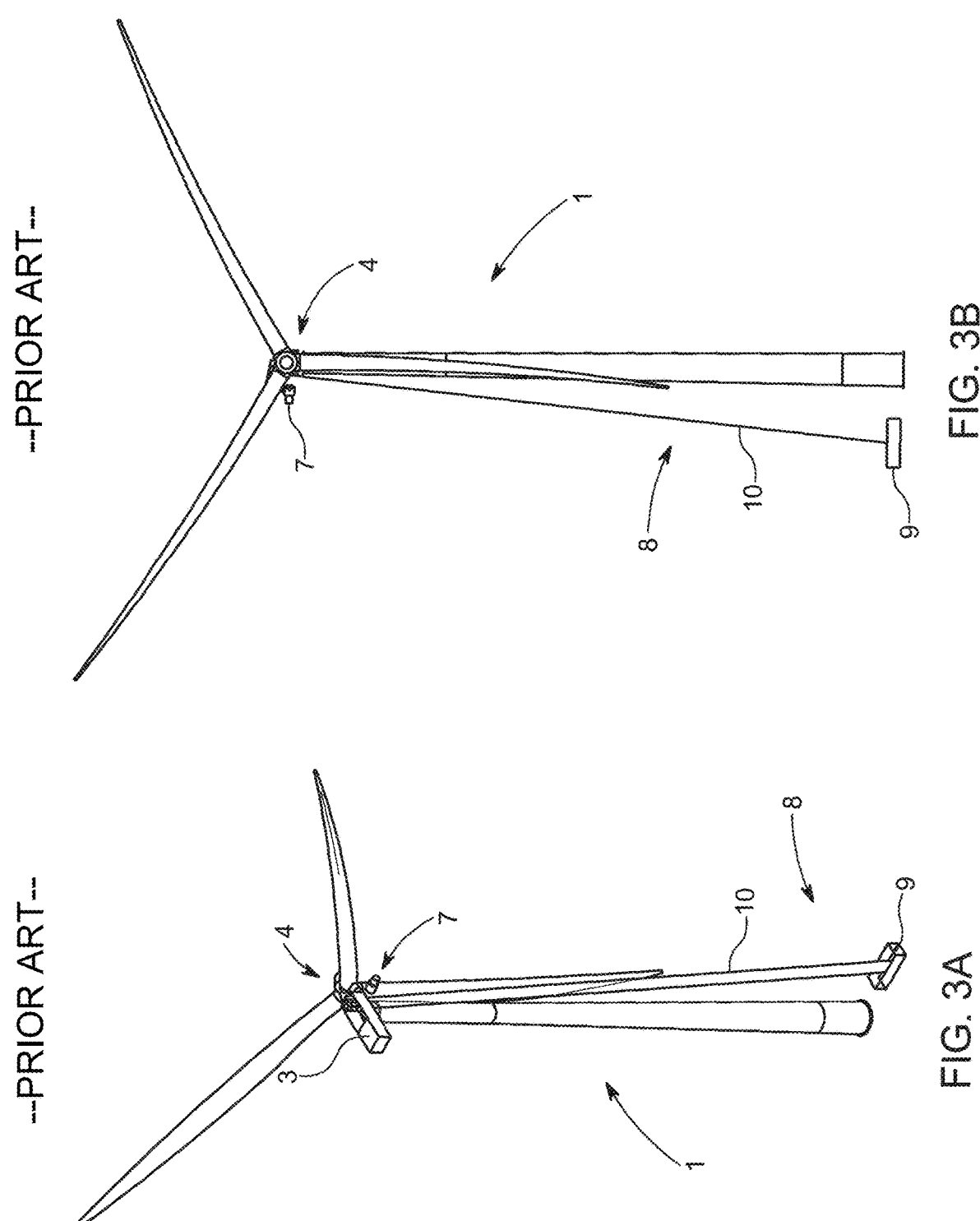
FIG. 3A is a perspective view of the wind turbine in the configuration shown in FIG. 2A, whereby a self-hoisting crane system is used for servicing the wind turbine, according to a prior art method.
FIG. 3B is a front view of the wind turbine and self-hoisting crane system shown in FIG. 3A.

The prior art procedure described just above generally works well when the rotor is oriented towards the wind. However, if the wind is blowing from other directions, challenges may often arise, as it will be explained further below. In real situations, the wind may come from all angles around the turbine, and the wind direction may change during servicing. For instance, as illustrated in FIGS. 3A and 3B, in the case that a self-hoisting crane 7 with a ground-based winch (not shown), placed in a container 9, is employed, the container with the winch cannot easily be repositioned during servicing.

Figure 8:
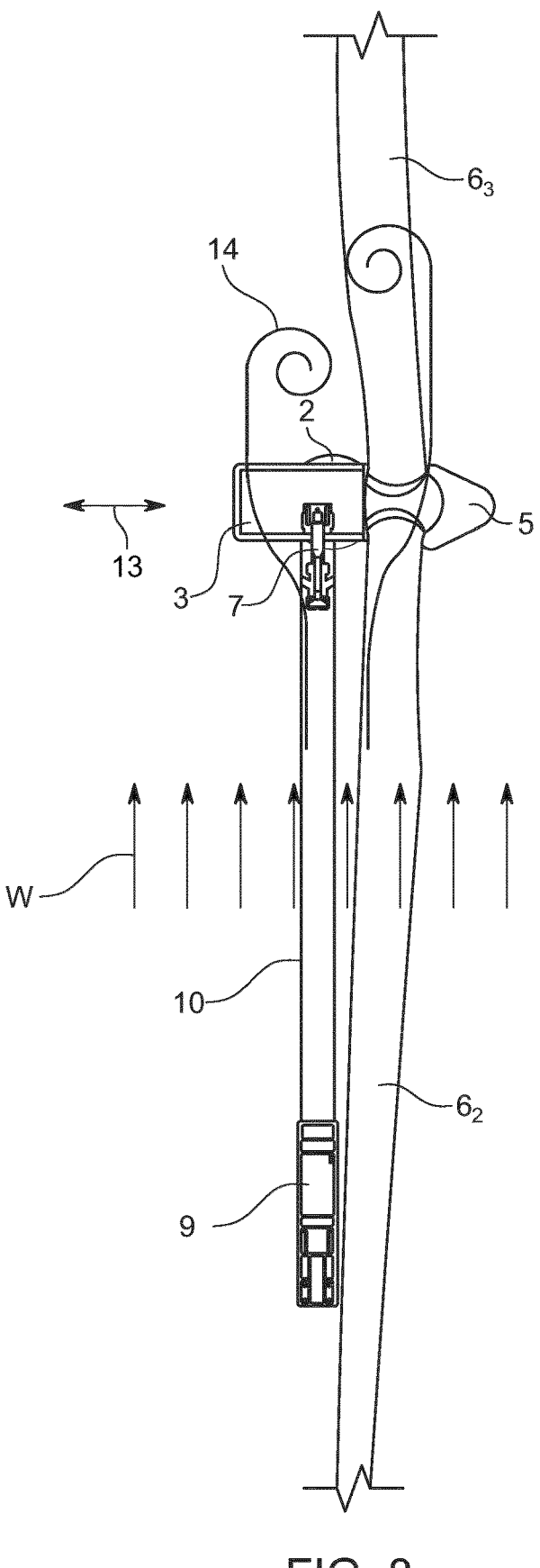
FIG. 8 is a partial top view of the wind turbine illustrated in FIG. 3A, whereby a self-hoisting crane system is used for servicing the wind turbine, and whereby a wind direction from the left of the wind turbine is indicated.
Figure 9:
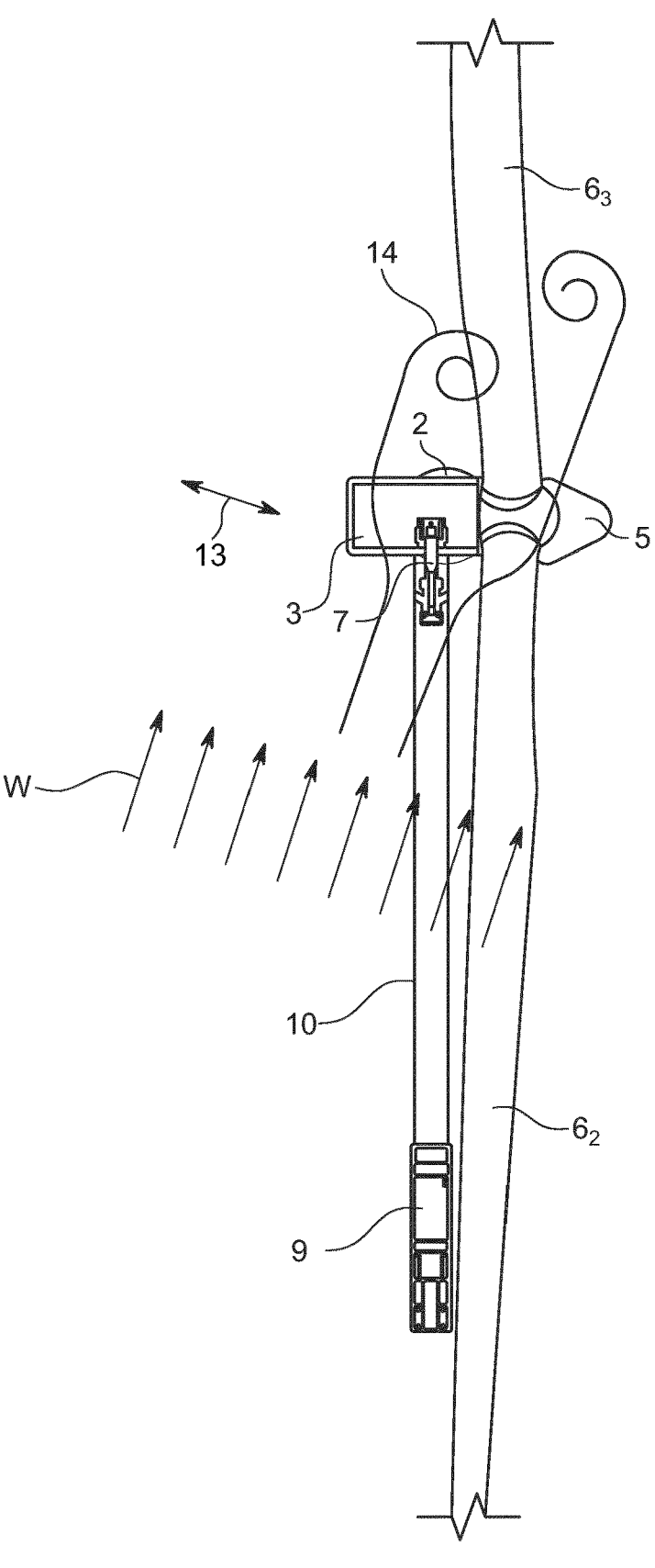
FIG. 9 is a top view corresponding to that of FIG. 8, whereby, however, a wind direction obliquely from the back and from the left of the wind turbine is indicated.

During the above-described known procedure of pitching all three wind turbine blades $6_1$, $6_2$, $6_3$ out of the wind during servicing, the wind forces may under certain circumstances cause the wind turbine tower 2 to sway back and forth above acceptable levels for performing service work in the nacelle. This may typically happen if the wind direction changes, and side wind becomes predominant. An example of such a situation is illustrated in FIGS. 8 and 9. In FIG. 8, the wind W comes directly from the left side of the wind turbine tower 2 which results in a swaying tower movement 13 in the transverse direction of the wind W. This may be caused by vortex shedding which is an oscillating flow that in this case takes place when the air flows past the wind turbine tower 2 at certain velocities. In this flow, vortices 14 are created behind the wind turbine tower, seen in the wind direction, and detach periodically from either side of the tower 2 forming a Von Karman vortex street, as indicated in the figure. The air flow past the wind turbine tower 2 creates alternating low-pressure vortices 14 on the downstream side of the tower 2, and the tower will tend to move toward the low-pressure zone. If the frequency of vortex shedding matches the resonance frequency of the wind turbine tower 2, then the tower can begin to resonate, vibrating with harmonic oscillations driven by the energy of the air. As seen, the vibrating tower movements 13 will occur in a transverse direction of the wind direction. In FIG. 9, a similar situation is illustrated, whereby the wind W comes obliquely from the back and from the left side of the wind turbine tower 2 which also results in swaying tower movements 13 in the transverse direction of the wind direction. Under certain circumstances, the vibrating tower movements 13 may exceed acceptable levels for performing service work in the nacelle.

According to the present invention, in order to overcome the above-described challenges, before performing the service work, a pitch angle adjustment of at least one of the wind turbine blades 6₁, 6₂, 6₃ is performed so that a pitch angle difference between respective pitch angles of two of the wind turbine blades is between 45 degrees and 135 degrees or between 225 degrees and 315 degrees. After performing the service work, a pitch angle adjustment of at least one of the wind turbine blades 6₁, 6₂, 6₃ is performed so that there is at least substantially no pitch angle difference between pitch angles of the respective wind turbine blades of the rotor 4. It is noted that not all wind turbines allow for a pitch angle adjustment of substantially more than 90 degrees, which may typically be sufficient. What is important is that some of the wind turbine blades 6₁, 6₂, 6₃ can be arranged with at least substantially differing pitch angles. Said in another way, it is important that some of the wind turbine blades 6₁, 6₂, 6₃ can be arranged with at least substantially differing angles of respective chord lines of the blades.

Thereby, during servicing, arranging some of the wind turbine blades 6₁, 6₂, 6₃ with at least substantially differing pitch angles, no matter in which direction the wind is blowing, at least one of the wind turbine blades may be oriented in such a way that it may at least to some extent prevent swaying of the tower 2 in a transverse direction of the wind direction with its resonance frequency, because sufficient drag forces are acting on said blade when the tower sways. For instance, if the wind comes from the left of the wind turbine tower 2, as illustrated in FIG. 8, when looking from the front side of the rotor 4, a wind turbine blade arranged at a pitch angle of 0 degrees may dampen swaying tower movement 13 in a transverse direction of the wind W as a result of vortex shedding at the tower. This is because the drag forces acting on said blade will be relatively large in the transverse direction of the wind W, i.e. when looking in said transverse direction, the pressure or suction side of the blade is seen.

On the other hand, if the wind comes from the front side of the rotor 4, a wind turbine blade arranged at a pitch angle of 90 degrees may dampen swaying of the tower 2 in a transverse direction of the wind as a result of vortex shedding at the tower.

According to the present invention, the rotor has three wind turbine blades 6₁, 6₂, 6₃ equally distributed about the rotor hub 5.

Furthermore, according to the present invention, before performing the service work, a first wind turbine blade 6₁ is adjusted by rotation to one of its possibly more non-operational pitch angles, a second wind turbine blade 6₂ is adjusted by rotation to one of its possibly more non-operational pitch angles, and the pitch angle of a third wind turbine blades 6₃ is maintained in or adjusted by rotation to one of its possibly more operational pitch angles. After performing the service work, the pitch angle of the first wind turbine blade 6₁ is adjusted by rotation to one of its possibly more operational pitch angles, and the pitch angle of the second wind turbine blade 6₂ is adjusted by rotation to one of its possibly more operational pitch angles.

According to the present invention, the rotor can typically be locked by means of existing rotor locks without exceeding the maximum locking torque of the rotor lock.

This may be advantageous, because it is typically not possible just increasing the size of current rotor locks in order to increase the wind speeds at which the rotor can be locked. This is due to the fact that the weight of the rotor lock is often a limiting factor, because a self-hoisting crane or a smaller up tower service crane has to lift the rotor lock to the nacelle. Furthermore, there are typically spatial limitations in the nacelle of a wind turbine.

Furthermore, according to the present invention, during the service work, the rotor 4 is maintained in a rotational position in which a longitudinal axis of the third wind turbine blade 6₃ forms an angle of not more than 5 degrees with a horizontal axis.

Figure 4B:
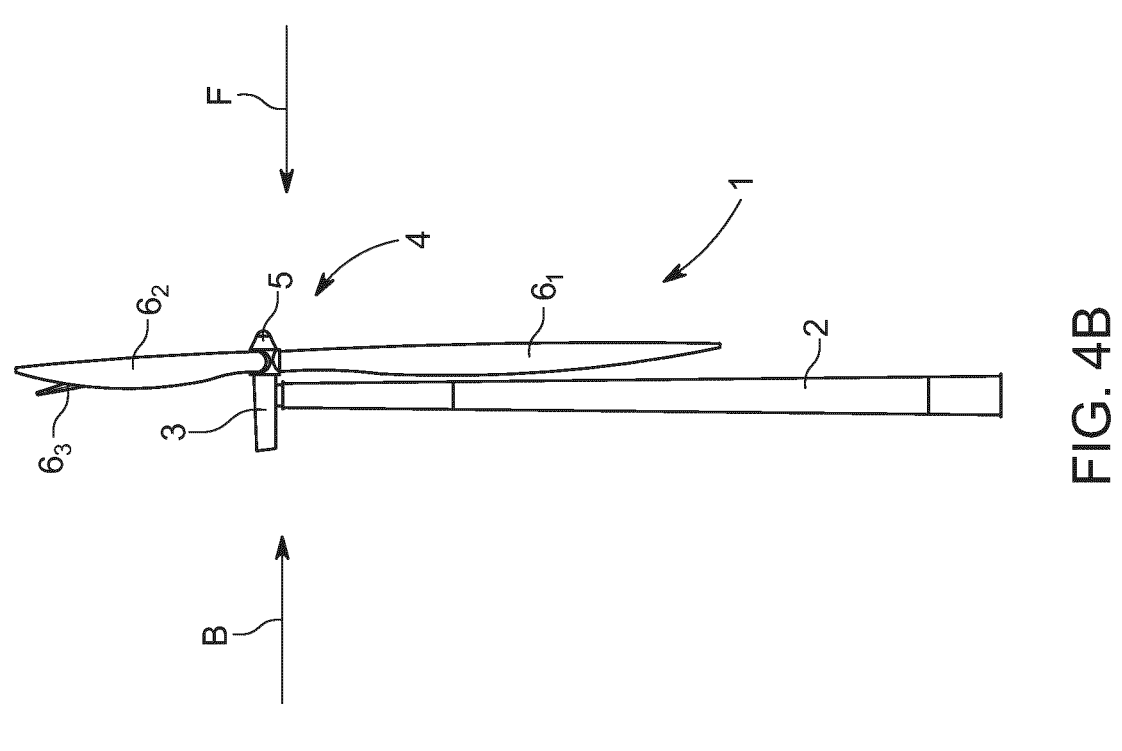
FIG. 4B is a side view of the wind turbine in the configuration shown in FIG. 4A.
Figure 4A:
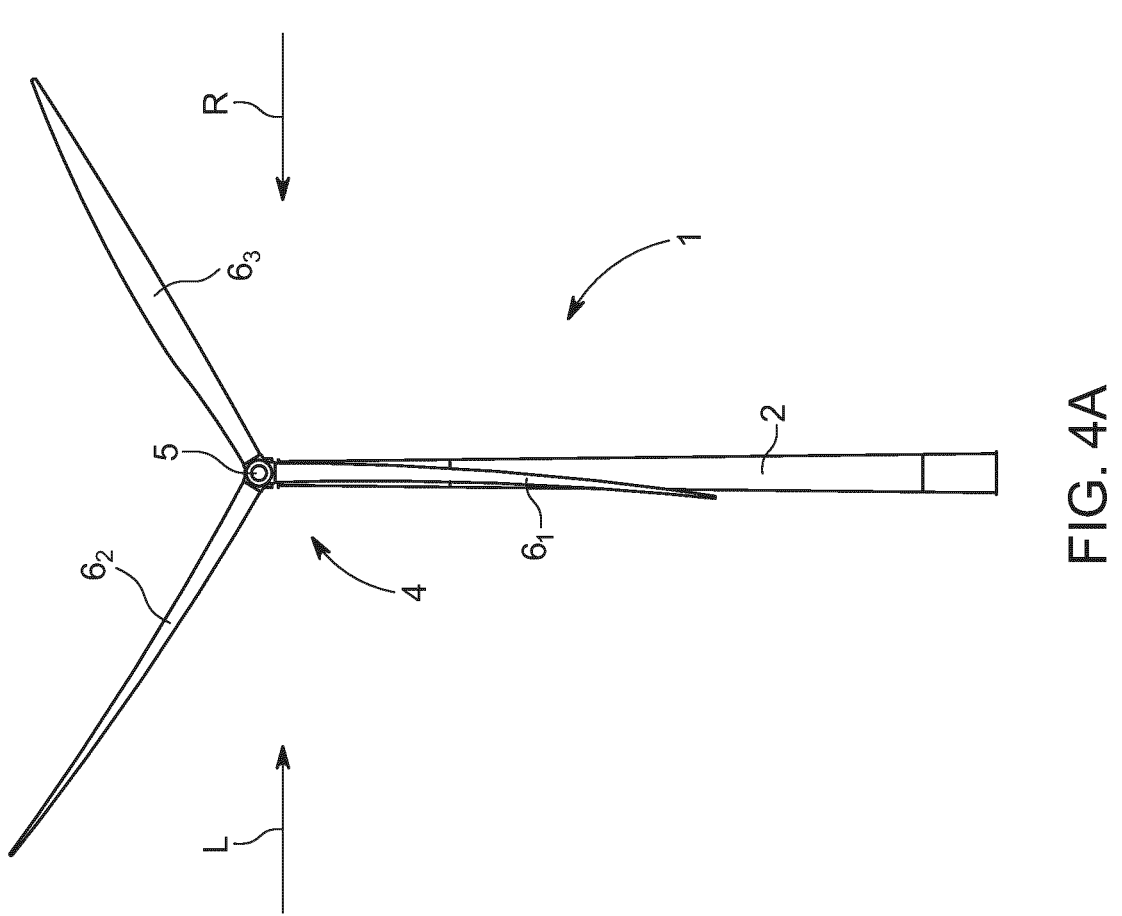
FIG. 4A is a front view of the wind turbine of FIG. 1A, whereby two blades have been adjusted to a pitch angle of 90 degrees and one blade is maintained at a pitch angle of 0 degrees (denoted Configuration 3)
Figure 5B:
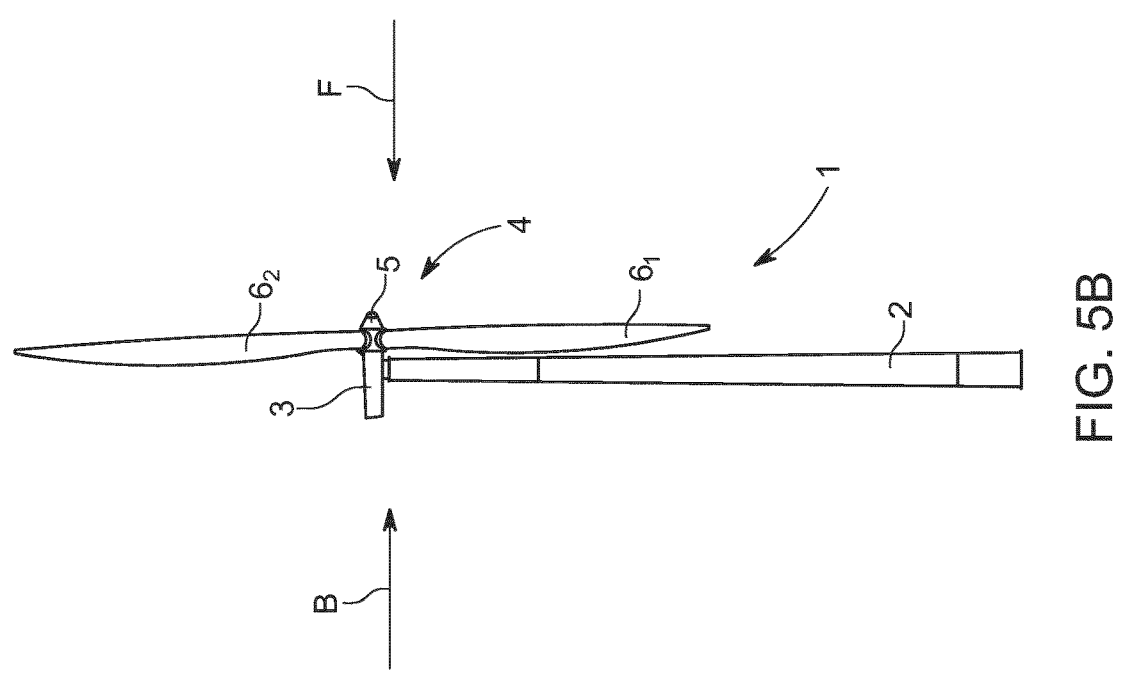
FIG. 5B is a side view of the wind turbine in the configuration shown in FIG. 5A.
Figure 5A:
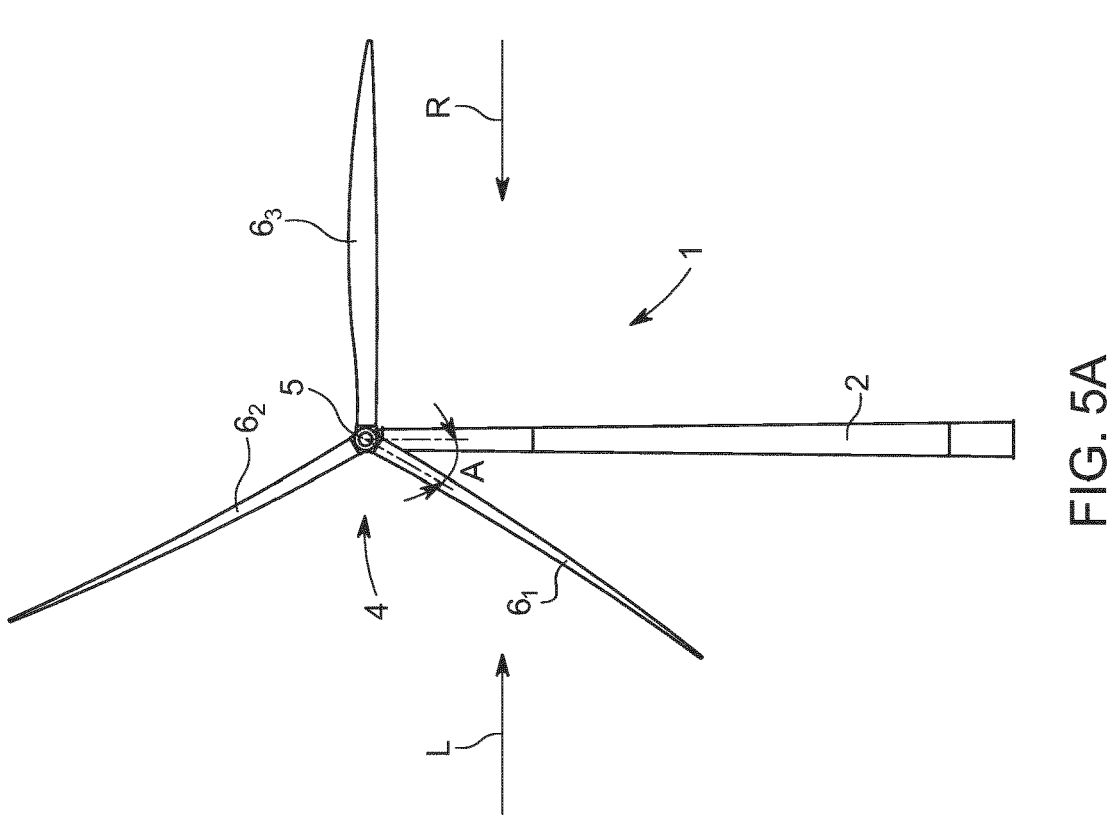
FIG. 5A is a front view of the wind turbine of FIG. 4A, whereby the blade having a pitch angle of 0 degrees has been arranged in a horizontal position (denoted Configuration 4)

FIGS. 5A and 5B illustrate a preferred embodiment of the method according to the present invention of performing service work on a horizontal axis wind turbine 1, whereby, during the service work, the rotor 4 is maintained in a rotational position in which a longitudinal axis of the third wind turbine blade 6₃ is substantially horizontal. According to the definition as illustrated in FIG. 5A, this corresponds to an azimuth angle A of approximately 30 degrees. As the rotor 4 has three blades, the angle between neighbouring blades is 120 degrees. As discussed in further detail below, simulations performed for several different wind directions have proven that, in this way, the maximum torque experienced by the rotor 4 during servicing and/or installation work as a result of the wind loads may be even lower than for the embodiment illustrated in FIGS. 4A and 4B.

Nevertheless, simulations have also indicated that if, during the service work, the rotor 4 is maintained in a rotational position (not shown) in which the longitudinal axis of the third wind turbine blade 6₃ forms an angle of not more than 5 degrees with a horizontal axis, the maximum torque experienced by the rotor 4 during servicing and/or installation work as a result of the wind loads is still lower than for the embodiment illustrated in FIGS. 4A and 4B.

In an embodiment, before performing the service work, a pitch angle adjustment of at least one of the wind turbine blades 6₁, 6₂, 6₃ is performed so that a pitch angle difference between respective pitch angles of two of the wind turbine blades is between 55 degrees and 125 degrees or between 235 degrees and 305 degrees, preferably between 65 degrees and 115 degrees or between 245 degrees and 295 degrees, more preferred between 75 degrees and 105 degrees or between 255 degrees and 285 degrees, even more preferred between 85 degrees and 95 degrees or between 265 degrees and 275 degrees, and most preferred about 90 degrees or about 270 degrees.

Preferably, the respective pitch angles of the wind turbine blades $6_1$, $6_2$, $6_3$ are adjusted by means of a not shown pitch control system of the wind turbine 1, wherein the pitch control system includes electric motors and/or hydraulic motors or cylinders.

When performing service work according to the present invention, preferably a self-hoisting crane 7 is lifted to the nacelle 3 of the wind turbine 1 and mounted at the nacelle, and the self-hoisting crane 7 is used for lifting and/or lowering components for the wind turbine 1. The components lifted may for instance be a gear transmission or other spare parts for the wind turbine.

According to the present invention, a self-hoisting crane system 8 may be employed like it is the case according to the prior art method illustrated in FIGS. 3A and 3B. The self-hoisting crane system 8 may include a self-hoisting crane 7 and a container 9 for transporting, lifting and lowering the self-hoisting crane 7 to and from the nacelle 3 of the wind turbine 1. The container 9 may include a cable winch, whereby at least one cable 10 is extended from the cable winch in the container 9 to the nacelle 3, and whereby the self-hoisting crane 7 is hoisted from the container 9 to the nacelle 3 by operating the cable winch in the container 9.

As described above, according to the present invention, in order to overcome the above-described challenges of swaying tower movement, before performing the service work, a pitch angle adjustment of at least one of the wind turbine blades $6_1$, $6_2$, $6_3$ is performed so that a substantial pitch angle difference is obtained between respective pitch angles of two of the wind turbine blades. However, in order to also minimize the wind loads on the rotor 4 and the resulting torque on a possible rotor lock, for a given wind turbine design, the maximum rotor torque should be considered.

As an example, the following simulation results have been obtained for a certain wind turbine design. A CFD (Computational Fluid Dynamics) analysis has been run for the following four different positioning configurations of the three wind turbine blades $6_1$, $6_2$, $6_3$.

The table of FIG. 6 illustrates the result of the CFD analysis by means of the resulting turning torque (kNm) on the main shaft of the turbine. This is the torque, the rotor lock must hold. The results are shown for the four position configurations mentioned below, and for each position configuration, for four different cases, namely the four different wind directions illustrated in FIGS. 1A and 1B, FIGS. 4A and 4B and FIGS. 5A and 5B: From left L (Case 1), from back B (Case 2), from front F (Case 3) and from right R (Case 4).

The table of FIG. 7 illustrates in more detail the result of the CFD analysis for position configuration 4 in that the partial contribution to the resulting turning torque (kNm) on the main shaft of the turbine resulting from each blade has been calculated. Wind turbine blades 1, 2 and 3 as indicated in the table of FIG. 7 correspond, respectively, to the wind turbine blades $6_1$, $6_2$, $6_3$ indicated in the figures.

Position configuration 1 (prior art method): All blades $6_1$, $6_2$, $6_3$ at 90 degrees pitch angle. In this configuration all blades are pitched out of wind, which means the turbine is non-operational. This configuration is illustrated in FIGS. 2A and 2B as well as in FIGS. 3A and 3B. As seen in the table of FIG. 6, the absolute peak turning torque is 327 kNm.

For this wind turbine, an existing rotor lock would be designed to hold at least this maximum turning torque. However, as described above, under certain circumstances, challenges with swaying tower movements may occur.

Position configuration 2: Two blades at 0 degrees pitch angle and one blade at 90 degrees pitch angle. In this configuration two blades are pitched into wind. If all three blades were in this position, the rotor would generate the most turning torque on the turbine in operational mode. This configuration is not illustrated in the figures. It is has been found that with this position configuration, challenges with swaying tower movements may be alleviated. However, as it is seen in the table of FIG. 6, with this position configuration, the absolute peak turning torque is 532 kNm which is larger than that of the above position configuration 1 (prior art). As a consequence, for this particular wind turbine, the position configuration 2 may not be a preferred position configuration. Therefore, according to the present invention, the below position configuration 4 is preferred.

Position configuration 3: One blade $6_3$ at 0 degrees pitch angle and two blades $6_1$, $6_2$ at 90 degrees pitch angle. In this configuration two blades are pitched out of the wind and one blade is pitched into the wind. The azimuth angle A according to the definition illustrated in FIG. 5A is in this configuration 0 degrees. This configuration is illustrated in FIGS. 4A and 4B. It is has been found that with this position configuration, challenges with swaying tower movements may be alleviated. However, as it is seen in the table of FIG. 6, with this position configuration, the absolute peak turning torque is 355 kNm which is larger than that of the above position configuration 1 (prior art). As a consequence, according to the present invention, the below position configuration 4 is preferred.

Position configuration 4 (an embodiment according to the present invention): One blade $6_3$ at 0 degrees pitch angle and two blades $6_1$, $6_2$ at 90 degrees pitch angle. In this configuration two blades are pitched out of the wind and one blade is pitched into the wind. The azimuth angle A according to the definition illustrated in FIG. 5A is in this configuration 30 degrees, whereby the blade having a pitch angle of 0 degrees has been arranged in a horizontal position. This configuration is illustrated in FIGS. 5A and 5B. As described above, according to the present invention, it is has been found that with this position configuration, challenges with swaying tower movements may be alleviated.

Moreover, as it is seen in the table of FIG. 6, with this position configuration, the absolute peak turning torque is 254 kNm which is even somewhat smaller than that of the above position configuration 1 (prior art). Therefore, according to the present invention, the position configuration 4 is the preferred position configuration.

As described above, according to the present invention, in order to overcome the above-described challenges of swaying tower movement, before performing the service work, a pitch angle adjustment of at least one of the wind turbine blades $6_1$, $6_2$, $6_3$ is performed so that a substantial pitch angle difference is obtained between respective pitch angles of two of the wind turbine blades. Therefore, the pitch angles during servicing do not in any way have to be either 0 degrees or 90 degrees, but may be chosen as falling within the definition of the invention according to the claims and as described above throughout the entire description.

Furthermore, the following numbered embodiments are described:

1. A method of performing service work on a horizontal axis wind turbine (1) having a tower (2) carrying a nacelle (3) with a rotor (4), the rotor having a rotor hub (5) and at least two wind turbine blades ($6_1$, $6_2$, $6_3$), each wind turbine blade being arranged rotatably on the rotor hub (5) about a pitch axis in order to adjust a pitch angle of the wind turbine blade, thereby defining an orientation of the wind turbine blade ($6_1$, $6_2$, $6_3$) about its pitch axis, whereby, before performing the service work, pitch angle adjustment is performed, and whereby, after performing the service work, pitch angle adjustment is performed, characterised by that, before performing the service work, a pitch angle adjustment of at least one of the wind turbine blades ($6_1$, $6_2$, $6_3$) is performed so that a pitch angle difference between respective pitch angles of two of the wind turbine blades is between 45 degrees and 135 degrees or between 225 degrees and 315 degrees, and by that, after performing the service work, a pitch angle adjustment of at least one of the wind turbine blades ($6_1$, $6_2$, $6_3$) is performed so that there is at least substantially no pitch angle difference between pitch angles of the respective wind turbine blades of the rotor (4).

2. A method of performing service work according to embodiment 1, whereby, before performing the service work, a pitch angle adjustment of at least one of the wind turbine blades ($6_1$, $6_2$, $6_3$) is performed so that a pitch angle difference between respective pitch angles of two of the wind turbine blades is between 55 degrees and 125 degrees or between 235 degrees and 305 degrees, preferably between 65 degrees and 115 degrees or between 245 degrees and 295 degrees, more preferred between 75 degrees and 105 degrees or between 255 degrees and 285 degrees, even more preferred between 85 degrees and 95 degrees or between 265 degrees and 275 degrees, and most preferred about 90 degrees or about 270 degrees.

3. A method of performing service work according to embodiment 1 or 2, whereby the rotor has three wind turbine blades ($6_1$, $6_2$, $6_3$) equally distributed about the rotor hub (5), whereby each wind turbine blade is arranged rotationally adjustably on the rotor hub (5) between at least one operational pitch angle corresponding to a normal operational angle of attack of the wind turbine blade ($6_1$, $6_2$, $6_3$) and at least one non-operational pitch angle corresponding to a non-operational angle of attack of the wind turbine blade ($6_1$, $6_2$, $6_3$), whereby, before performing the service work, the pitch angle of at least a first ($6_1$) one of the wind turbine blades ($6_1$, $6_2$, $6_3$) is adjusted by rotation to one of its at least one non-operational pitch angles, and the pitch angle of each remaining wind turbine blade ($6_2$, $6_3$) is maintained in or adjusted by rotation to one of its respective at least one operational pitch angles, and by that, after performing the service work, the pitch angle of the at least first ($6_1$) one of the wind turbine blades ($6_1$, $6_2$, $6_3$) is adjusted by rotation to one of its at least one operational pitch angles.

4. A method of performing service work according to embodiment 3, whereby, before performing the service work, the respective pitch angles of the first ($6_1$) one and a second ($6_2$) one of the wind turbine blades ($6_1$, $6_2$, $6_3$) are adjusted by rotation to one of their at least one non-operational pitch angles, and the pitch angle of a third ($6_3$) one of the wind turbine blades ($6_1$, $6_2$, $6_3$) is maintained in or adjusted by rotation to one of its at least one operational pitch angles, and by that, after performing the service work, the respective pitch angles of the first and the second wind turbine blades ($6_1$, $6_2$) are adjusted by rotation to one of their at least one operational pitch angles.

5. A method of performing service work according to embodiment 4, whereby, during the service work, the rotor (4) is maintained in a rotational position in which a longitudinal axis of the third wind turbine blade ($6_3$) forms an angle of not more than 15 degrees, preferably not more than 10 degrees and most preferred not more than 5 degrees with a horizontal axis.

6. A method of performing service work according to any one of the embodiments 3 to 5, whereby the at least one operational pitch angle deviates not more than 10 degrees, and preferably not more than 5 degrees, from a theoretical pitch angle of 0 degrees.

7. A method of performing service work according to any one of the preceding embodiments, whereby the respective pitch angles of the wind turbine blades ($6_1$, $6_2$, $6_3$) are adjusted by means of a pitch control system of the wind turbine (1), the pitch control system including electric motors and/or hydraulic motors or cylinders.

8. A method of performing service work according to any one of the preceding embodiments, whereby, before performing the service work, the rotor (4) is fixed against rotation, and whereby, after performing the service work, the rotor (4) is set free for rotation.

9. A method of performing service work according to embodiment 8, whereby the rotor (4) is fixed against rotation by means of a main shaft fixture adapted for fixation of a main shaft of the rotor (4).

10. A method of performing service work according to embodiment 9, whereby the rotor (4) is fixed against rotation by means of a separate, removable main shaft fixture which is hoisted up to the nacelle (3) before performing the service work and which is hoisted down from the nacelle after performing the service work.

11. A method of performing service work according to any one of the preceding embodiments, whereby a self-hoisting crane (7) is lifted to the nacelle (3) of the wind turbine (1) and mounted at the nacelle, and whereby the self-hoisting crane (7) is used for lifting and/or lowering components for the wind turbine (1).

12. A method of performing service work according to embodiment 11, whereby a self-hoisting crane system (8) includes the self-hoisting crane (7) and a container (9) for transporting, lifting and lowering the self-hoisting crane (7) to and from the nacelle (3) of the wind turbine (1), whereby the container (9) includes a cable winch, whereby at least one cable (10) is extended from the cable winch in the container (9) to the nacelle (3), and whereby the self-hoisting crane (7) is hoisted from the container (9) to the nacelle (3) by operating the cable winch in the container (9).

LIST OF REFERENCE NUMBERS

W wind
L wind direction from left when looking from front of rotor
R wind direction from right when looking from front of rotor
F wind direction from front of rotor
B wind direction from back of rotor
A azimuth angle
1 horizontal axis wind turbine
2 tower
3 nacelle 4 rotor
5 rotor hub
6₁ first wind turbine blade
6₂ second wind turbine blade
6₃ third wind turbine blade
7 self-hoisting crane
8 self-hoisting crane system
9 container
10 cable
11 root end of blade
12 tip end of blade
13 tower movement
14 vortex

The invention claimed is:

1. A method of performing service work on a horizontal axis wind turbine having a tower carrying a nacelle with a rotor, the rotor having a rotor hub and three wind turbine blades equally distributed about the rotor hub, each wind turbine blade being arranged rotationally adjustably on the rotor hub about a pitch axis between at least one operational pitch angle corresponding to a normal operational angle of attack of the wind turbine blade and at least one non-operational pitch angle corresponding to a non-operational angle of attack of the wind turbine blade, wherein an operational pitch angle is defined as an angle which deviates not more than 10 degrees from a theoretical pitch angle of 0 degrees and wherein a non-operational pitch angle is defined as an angle which does not deviate more than 20 degrees from a theoretical pitch angle of 90 degrees, whereby, before performing the service work, a pitch angle adjustment of a first one of said three wind turbine blades is performed so that a pitch angle difference between respective pitch angles of the first one and a third one of said three wind turbine blades is between 45 degrees and 135 degrees or between 225 degrees and 315 degrees, whereby before performing the service work, the respective pitch angles of the first one and a second one of the three wind turbine blades are adjusted by rotation to one of their at least one non-operational pitch angles, and the pitch angle of the third one of the three wind turbine blades is maintained in or adjusted by rotation to one of its at least one operational pitch angles, whereby, after performing the service work, a pitch angle adjustment of the first one and the second one of the three wind turbine blades is performed so that there is at least substantially no pitch angle difference between pitch angles of the three wind turbine blades of the rotor, and whereby, after performing the service work, the respective pitch angles of the first one and the second one of the three wind turbine blades are adjusted by rotation to one of their at least one operational pitch angles, wherein, during the service work, the rotor is maintained in a rotational position in which a longitudinal axis of the third one of the three wind turbine blade forms an angle of not more than 5 degrees with a horizontal axis.

2. The method of performing service work according to claim 1, whereby, before performing the service work, a pitch angle adjustment of at least one of the three wind turbine blades is performed so that a pitch angle difference between respective pitch angles of two of the three wind turbine blades is between 55 degrees and 125 degrees or between 235 degrees and 305 degrees.

3. The method of performing service work according to claim 1, whereby the at least one operational pitch angle deviates not more than 5 degrees, from the theoretical pitch angle of 0 degrees.

4. The method of performing service work according to claim 1, whereby the respective pitch angles of the wind turbine blades are adjusted by means of a pitch control system of the wind turbine, the pitch control system including electric motors and/or hydraulic motors or cylinders.

5. The method of performing service work according to claim 1, whereby, before performing the service work, the rotor is fixed against rotation, and whereby, after performing the service work, the rotor is set free for rotation.

6. The method of performing service work according to claim 1, whereby a self-hoisting crane is lifted to the nacelle of the wind turbine and mounted at the nacelle, and whereby the self-hoisting crane is used for lifting and/or lowering components for the wind turbine.

7. The method of performing service work according to claim 1, whereby the non-operational pitch angle is defined as 90 degrees, 85 degrees, 80 degrees or 75 degrees.

8. The method of performing service work according to claim 1, whereby, before performing the service work, the pitch angle adjustment of the first one of the three wind turbine blades is performed so that the pitch angle difference between respective pitch angles of the first one and the third one of the three wind turbine blades is between 75 degrees and 105 degrees and the pitch angle adjustment of the second one of the three wind turbine blades is performed so that a pitch angle difference between respective pitch angles of the second one and the third one of the three wind turbine blades is between 75 degrees and 105 degrees.

9. The method of performing service work according to claim 1, whereby, before performing the service work, the pitch angle adjustment of the first one of the three wind turbine blades is performed so that the pitch angle difference between respective pitch angles of the first one and the third one of the three wind turbine blades is between 85 degrees and 95 degrees and the pitch angle adjustment of the second one of the three wind turbine blades is performed so that a pitch angle difference between respective pitch angles of the second one and the third one of the three wind turbine blades is between 85 degrees and 95 degrees.

* * * * *